US011539057B2

(12) United States Patent
Ohmori et al.

(10) Patent No.: US 11,539,057 B2
(45) Date of Patent: Dec. 27, 2022

(54) FUEL CELL SEPARATOR MEMBER AND FUEL CELL

(71) Applicant: HONDA MOTOR CO., LTD., Tokyo (JP)

(72) Inventors: Suguru Ohmori, Wako (JP); Masayuki Katsuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 17/159,531

(22) Filed: Jan. 27, 2021

(65) Prior Publication Data

US 2021/0242474 A1 Aug. 5, 2021

(30) Foreign Application Priority Data

Jan. 30, 2020 (JP) .............................. JP2020-013744

(51) Int. Cl.
| | | |
|---|---|---|
| *H01M 8/0247* | (2016.01) | |
| *H01M 8/1004* | (2016.01) | |
| *H01M 8/0232* | (2016.01) | |
| *H01M 8/0245* | (2016.01) | |
| *H01M 8/0239* | (2016.01) | |

(52) U.S. Cl.
CPC ....... *H01M 8/0247* (2013.01); *H01M 8/0232* (2013.01); *H01M 8/0239* (2013.01); *H01M 8/0245* (2013.01); *H01M 8/1004* (2013.01); *H01M 2250/20* (2013.01)

(58) Field of Classification Search
CPC ............ H01M 8/0247; H01M 8/1004; H01M 8/2475; H01M 2008/1095; H01M 8/0202; H01M 8/0297; H01M 8/242; H01M 8/2465; H01M 8/02; H01M 8/0258; H01M 8/0271; H01M 8/0273; Y02E 60/50
See application file for complete search history.

(56) References Cited

U.S. PATENT DOCUMENTS

2016/0072145 A1* 3/2016 Martinchek ........... H01M 8/247
429/535
2018/0366761 A1 12/2018 Ohmori et al.

FOREIGN PATENT DOCUMENTS

JP 2019-003830 A 1/2019

* cited by examiner

*Primary Examiner* — Helen Oi K Conley
(74) *Attorney, Agent, or Firm* — Carrier Blackman & Associates, P.C.; Joseph P. Carrier; Fulchand P. Shende

(57) ABSTRACT

A tab of a load receiver forming a fuel cell separator member includes a base portion in the form of a metal plate, and a resin member covering the base portion. A hole, into which the resin member is partially inserted, is formed in the base portion. The resin member includes a thick portion, and a thin portion positioned closer to a first separator than the thick portion is. The hole is disposed so as to be overlapped with the thick portion.

15 Claims, 6 Drawing Sheets

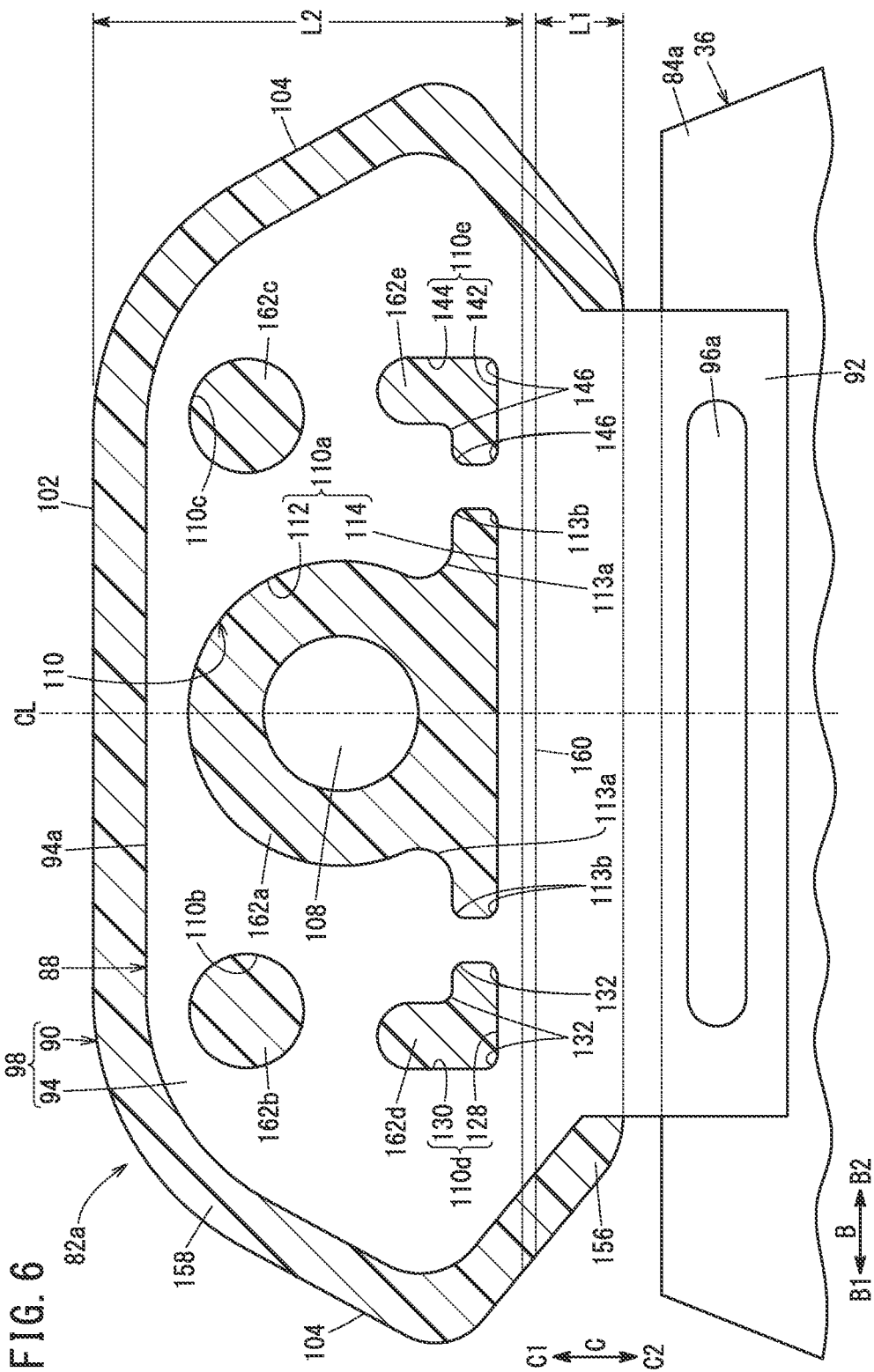

FUEL CELL SEPARATOR MEMBER AND FUEL CELL

CROSS-REFERENCE TO RELATED APPLICATION

This application is based upon and claims the benefit of priority from Japanese Patent Application No. 2020-013744 filed on Jan. 30, 2020, the contents of which are incorporated herein by reference.

BACKGROUND OF THE INVENTION

Field of the Invention

The present invention relates to a fuel cell separator member and a fuel cell.

Description of the Related Art

For example, a fuel cell stack of Japanese Laid-Open Patent Publication No. 2019-003830 includes a stack body formed by stacking a plurality of power generation cells (fuel cells) together alternately. Each of the power generation cells includes an MEA (membrane electrode assembly) and a pair of separators provided on both sides of the MEA. The MEA includes an electrolyte membrane and electrodes provided on both sides of the electrolyte membrane. In an outer peripheral portion of one of the separators, a load receiver having a tab protruding toward the outside of the separator is provided.

When an external load in the width direction of the tab (direction perpendicular to a direction in which the tab protrudes and to the separator thickness direction) is applied to the fuel cell stack, the tab contacts a support member provided in the end plate, the stack case, etc. That is, the load receiver receivers the external load applied to the fuel cell stack. Thus, positional displacement of the separator from the MEA is suppressed. The tab includes a base portion in the form of a metal plate, and a resin member covering a base portion.

SUMMARY OF THE INVENTION

In this regard, in the case of forming the load receiver by insert molding, when contraction occurs after insert molding, the difference between the coefficient of linear thermal expansion of the base portion and the coefficient of linear thermal expansion of the resin member causes generation of a stress in a resin member. Such a stress is also generated due to the temperature change as a result of the change of the environment. Therefore, the thickness of the resin member needs to be determined in a manner to avoid damages of the resin member due to generation of such a stress.

In the case of forming a hole for improving the fluidity of the resin material (melted resin) at the time of performing insert molding, a sink can be generated easily at a position of the hole in the resin material.

Further, in the case of forming a thin portion and a thick portion in the resin member, and disposing the thin portion in a manner that the thin portion is overlapped with the hole of base portion as viewed in the separator thickness direction, there is a concern that the thickness of the resin member is reduced to a greater extent due to the sink of the resin member, and the strength of the thin portion is reduced.

The present invention has been made taking such a problem into account, and an object of the present invention is to provide a fuel cell separator member and a fuel cell in which it is possible to suppress decrease in the strength of a thin portion of a resin member, and form a load receiver efficiently by insert molding.

According to a first aspect of the present invention, provided is a fuel cell separator member including a separator, and a load receiver including a tab protruding from an outer peripheral portion of the separator toward an outside of the separator, wherein the tab includes a base portion in a form of a metal plate, and a resin member configured to cover the base portion; a hole is formed in the base portion, an inner circumference of the hole being covered with a part of the resin member; the resin member includes a thick portion, and a thin portion positioned closer to the separator than the thick portion is; and the hole is disposed so as to be overlapped with the thick portion, of the thick portion and the thin portion.

According to a second aspect of the present invention, provided is a fuel cell including a membrane electrode assembly including an electrolyte membrane and electrodes provided on both sides of the electrolyte membrane, a fuel cell separator member provided on one surface of the membrane electrode assembly, a separator provided on another surface of the membrane electrode assembly. The fuel cell separator member is the fuel cell separator member as described above.

In the present invention, the hole of the base portion is disposed in the thick portion at the time of forming the load receiver by insert molding. In this manner, it is possible to improve the fluidity of the resin material (melted resin). Therefore, it is possible to form the load receiver efficiently by insert molding. Further, as viewed in the separator thickness direction, the hole of the base portion is disposed so as to be overlapped with the thick portion. Therefore, at the time of forming the load receiver by insert molding, it is possible to eliminate or reduce the situations where the thickness of the thin portion is reduced to a greater extent by formation of the sink in the resin material. As a result, it is possible to suppress decrease in the strength of the thin portion of the resin member.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a cross sectional view taken along a line in VI-VI of the load receiver in FIG. 4.

DESCRIPTION OF THE PREFERRED EMBODIMENTS

Hereinafter, a preferred embodiment of a fuel cell separator member and a fuel cell according to the present invention will be described with reference to the accompanying drawings.

Figure 1:
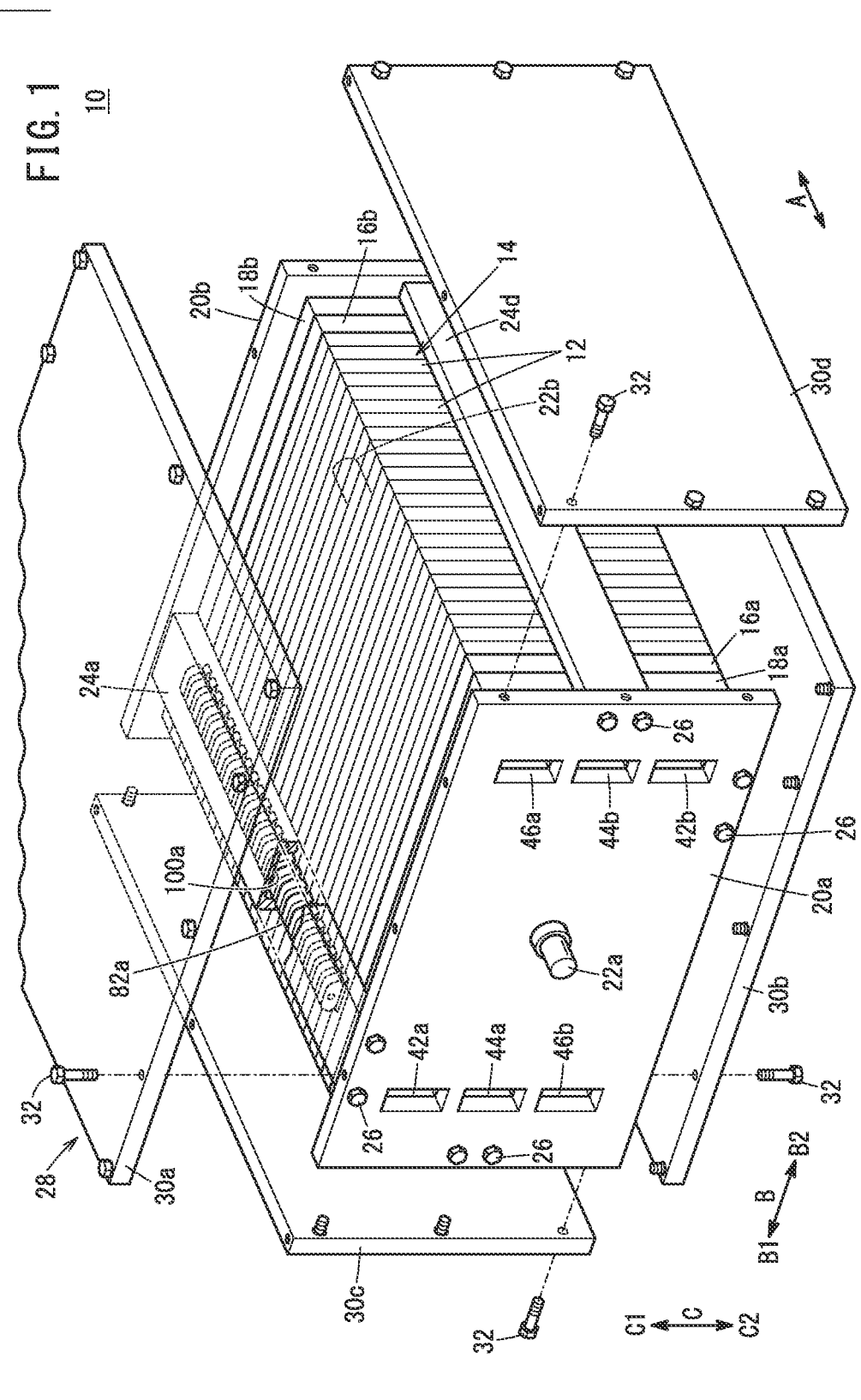
FIG. 1 is a partial exploded perspective view showing a fuel cell stack according to an embodiment of the present invention.

As shown in FIG. 1, a fuel cell stack 10 according to an embodiment of the present invention includes a stack body 14 formed by stacking a plurality of power generation cells 12 (fuel cells) together. For example, the fuel cell stack 10 is mounted in a fuel cell automobile in a manner that a stacking direction in which a plurality of power generation cells 12 are stacked together (indicated by an arrow A) is oriented in a horizontal direction (vehicle width direction or vehicle length direction) of the fuel cell automobile. Alternatively, the fuel cell stack 10 may be mounted in the fuel cell automobile in a manner that the stacking direction in which the plurality of power generation cells 12 are stacked together is oriented in a vertical direction (vehicle height direction) of the fuel cell automobile.

At one end of the stack body 14 in the stacking direction, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b.

An output terminal 22a is connected electrically to the terminal plate 16a. An output terminal 22b is connected electrically to the terminal plate 16b. Each of the insulators 18a, 18b is an electrically insulating plate.

Figure 2:
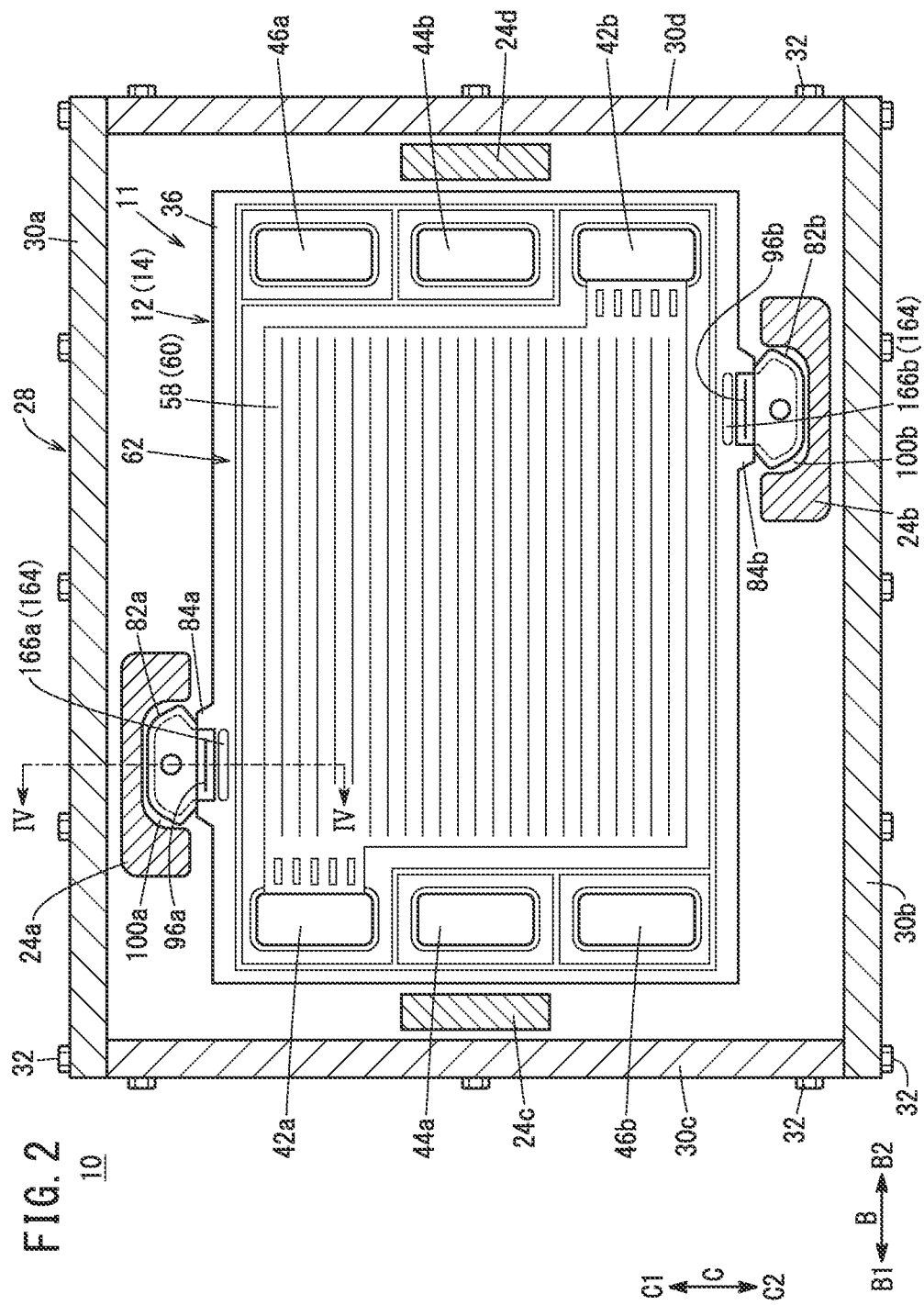
FIG. 2 is a lateral cross sectional view schematically showing a fuel cell stack in FIG. 1.

Each of the end plates 20a, 20b has a laterally elongated rectangular shape. As shown in FIGS. 1 and 2, coupling members 24a to 24d (coupling bars) are disposed between the sides of the end plates 20a, 20b. Both ends of the coupling members 24a to 24d are fixed to inner surfaces of the end plates 20a, 20b using bolts 26 (see FIG. 1). However, a tightening load (compression load) is applied to the coupling members 24a to 24d to the fuel cell stack 10 (stack body 14) in the stacking direction (indicated by the arrow A).

In FIG. 2, the position of the coupling member 24a is shifted from the center of the long side of one of the end plates 20a, 20b. The position of the coupling member 24b is shifted from the center of the long side of the other side of the end plate 20a, 20b toward the other side. The coupling members 24c, 24d are positioned at the centers of the short sides of the end plates 20a, 20b.

As shown in FIGS. 1 and 2, the fuel cell stack 10 includes a cover 28 which covers the stack body 14 from directions (indicated by the arrows B and C) perpendicular to the stacking direction. The cover 28 includes a pair of side panels 30a, 30b having a laterally elongated plate shape and forming two surfaces at both ends of the end plates 20a, 20b in a lateral direction (indicated by an arrow C), and a pair of side panels 30c, 30d having a laterally elongated plate shape and forming two surfaces at both ends of the end plates 20a, 20b in a longitudinal direction (indicated by an arrow B).

Each of the side panels 30a to 30d is fixed to side surfaces of the end plates 20a, 20b using bolts 32. It is adequate that the cover 28 is used as necessary. The cover 28 may be dispensed with. The cover 28 may have a cylindrical shape, produced by forming the side panels 30a to 30d integrally into one piece by casting or extrusion.

Figure 3:
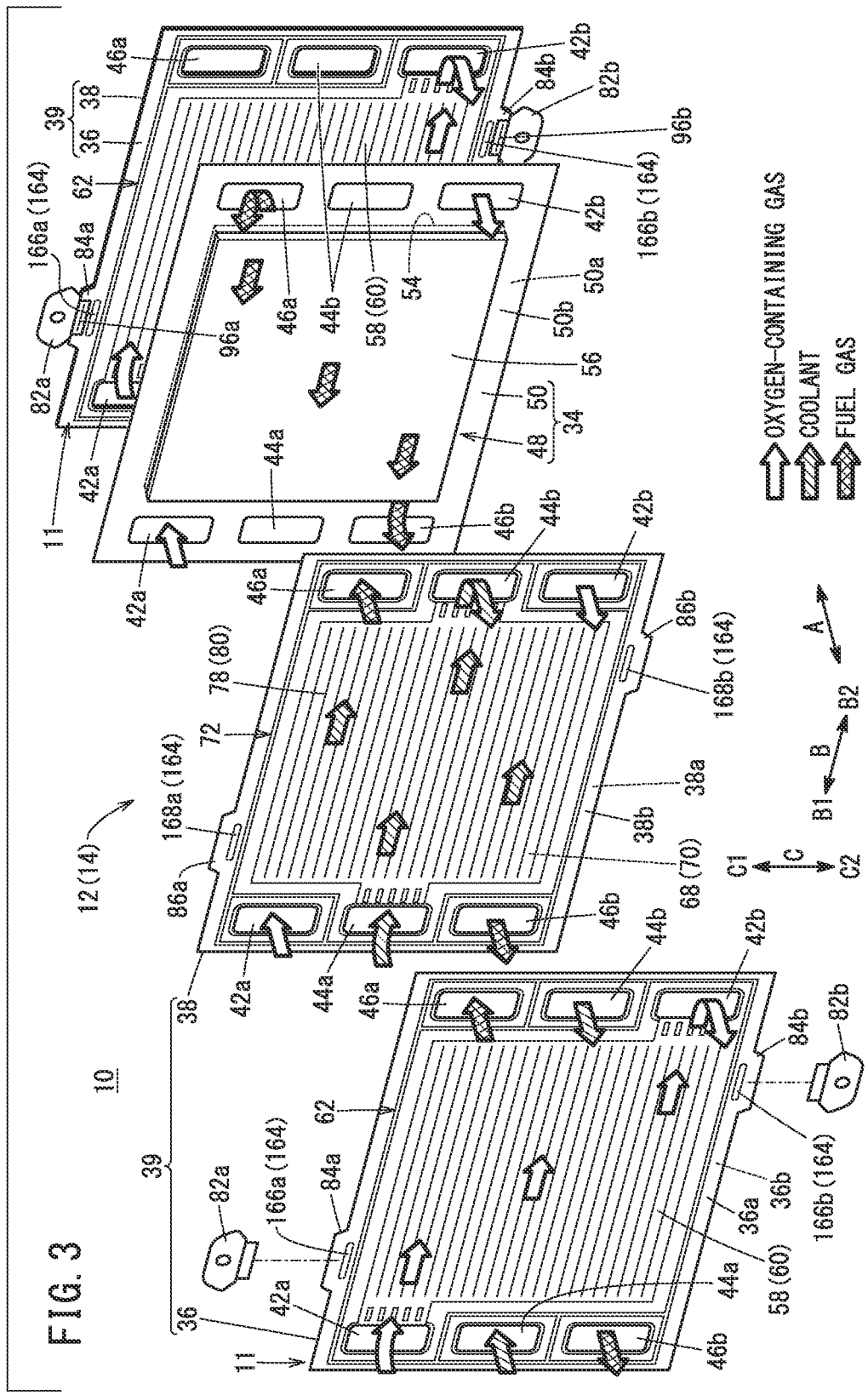
FIG. 3 is an exploded perspective view showing main components of a stack body of the fuel cell stack in FIG. 1.

As shown in FIG. 3, the power generation cell 12 includes a resin frame equipped MEA 34, and a first separator 36 and a second separator 38 sandwiching the resin frame equipped MEA 34 in the direction indicated by the arrow A.

At one end of the power generation cells 12 in the long side direction indicated by the arrow B (an end in the direction indicated by the arrow B1), an oxygen-containing gas supply passage 42a, a coolant supply passage 44a, and a fuel gas discharge passage 46b are arranged in the direction indicated by the arrow C. The oxygen-containing gas supply passage 42a of each of the power generation cells 12 extends through the plurality of power generation cells 12 in the stacking direction (indicated by the arrow A) for supplying the oxygen-containing gas. The coolant supply passage 44a extends through each of the power generation cells 12 in the direction indicated by the arrow A for supplying a coolant (such as pure water ethylene glycol, oil). The fuel gas discharge passage 46b extends through each of the power generation cells 12 in the direction indicated by the arrow A for discharging a fuel gas (e.g., a hydrogen containing gas).

At the other end of the power generation cells 12 in the direction indicated by the arrow B (an end in the direction indicated by the arrow B2), a fuel gas supply passage 46a, a coolant discharge passage 44b, and an oxygen-containing gas discharge passage 42b are arranged in the direction indicated by the arrow C. The fuel gas supply passage 46a extends through each of the power generation cells 12 in the direction indicated by the arrow A, for supplying a fuel gas. The coolant discharge passage 44b extends through each of the power generation cells 12 in the direction indicated by the arrow A, for discharging the coolant. The oxygen-containing gas discharge passage 42b extends through each of the power generation cells 12 in the direction indicated by the arrow A, for discharging the oxygen-containing gas.

It should be noted that the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are formed also in the end plate 20a (see FIG. 1).

The sizes, positions, shapes, and the numbers of the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are not limited to the embodiment, and may be determined as necessary depending on the required specification.

Figure 4:
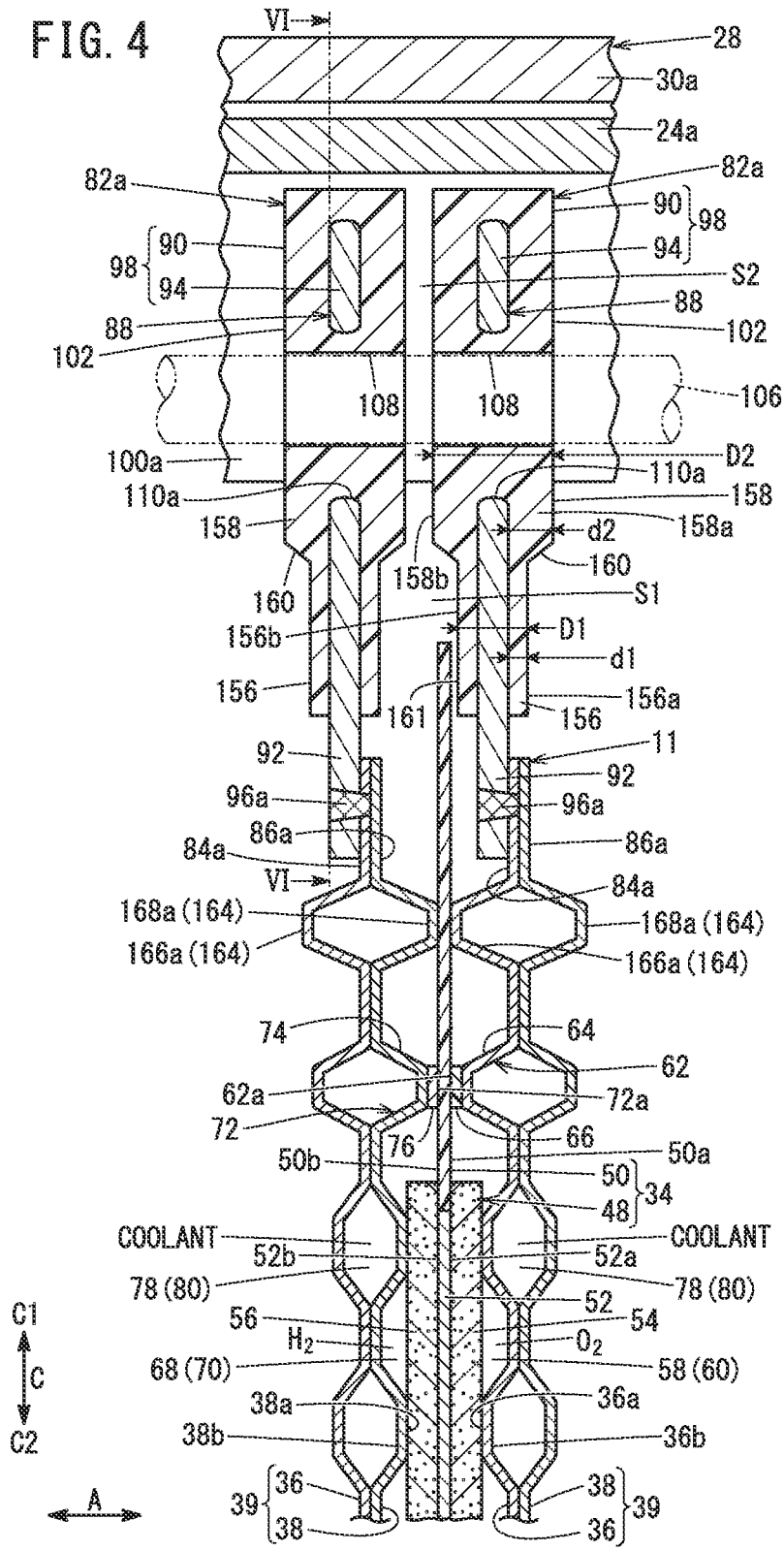
FIG. 4 is a cross sectional view taken along a line IV-IV in FIG. 2.

As shown in FIGS. 3 and 4, the resin frame equipped MEA 34 includes a membrane electrode assembly (hereinafter referred to as an "MEA 48"), and a resin frame member 50 (resin frame portion, resin film) including an overlap portion overlapped with the outer peripheral portion of the MEA 48, and formed around the outer peripheral portion. In FIG. 4, the MEA 48 includes an electrolyte membrane 52, a cathode 54 provided on one surface 52a of the electrolyte membrane 52, and an anode 56 provided on another surface 52b of the electrolyte membrane 52

For example, the electrolyte membrane 52 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 52. Alternatively, an HC (hydrocarbon) based electrolyte may be used as the electrolyte membrane 52. The electrolyte membrane 52 is held between the cathode 54 and the anode 56.

Although not shown in details, the cathode 54 includes a first electrode catalyst layer joined to one surface 52a of the electrolyte membrane 52, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The anode 56 includes a second electrode catalyst layer joined to the other surface 52b of the electrolyte membrane 52, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size of the electrolyte membrane 52 is smaller than the surface sizes of the cathode 54 and the anode 56. The outer marginal portion of the cathode 54 and the outer marginal portion of the anode 56 hold the inner marginal portion of the resin frame member 50. The resin frame member 50 has non-impermeable structure where the reactant gases (the oxygen-containing gas and the fuel gas) do not pass through the resin frame member 50. The resin frame member 50 is provided on the outer peripheral side of the MEA 48.

The resin frame equipped MEA 34 may not use the resin frame member 50, and may use the electrolyte membrane 52 which protrude outward. Further, the resin frame equipped MEA 34 may be formed by providing frame shaped films on both sides of the protruding electrolyte membrane 52.

In FIG. 3, each of the first separator 36 and the second separator 38 is made of metal and has a rectangular (quadrangular) shape. Each of the first separator 36 and the second separator 38 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. In the state where the first separator 36 and the second separator 38 are overlapped with each other, outer ends thereof are joined together by welding, brazing, crimping, etc. integrally to form a joint separator 39. The first separator 36 forms a fuel cell separator member 11 described later.

As shown in FIGS. 3 and 4, the first separator 36 has an oxygen-containing gas flow field 58 on its surface 36a facing the MEA 48. The oxygen-containing gas flow field 58 is connected to the oxygen-containing gas supply passage 42a and the oxygen-containing gas discharge passage 42b. The oxygen-containing gas flow field 58 includes a plurality of oxygen-containing gas flow grooves 60 extending straight in the direction indicated by the arrow B. Each of the oxygen-containing gas flow grooves 60 may extend in the direction indicated by the arrow B in a wavy pattern.

A first seal 62 is provided on the first separator 36, around the outer peripheral portion of the first separator 36, for preventing leakage of fluid (oxygen-containing gas, fuel gas and coolant) to the outside from a portion between the MEA 34 and the first separator 36. The first seal 62 extends straight as viewed in the separator thickness direction (indicated by the arrow A). Alternatively, the first seal 62 may extend in a wavy pattern as viewed in the separator thickness direction.

In FIG. 4, the first seal 62 includes a first metal bead 64 formed integrally with the first separator 36, and a first resin member 66 provided on the first metal bead 64. The first metal bead 64 protrudes from the first separator 36 toward the resin frame member 50. The first metal bead 64 has a trapezoidal shape in lateral cross section which is tapered (narrowed) in a protruding direction in which the first metal bead 64 protrudes. The first resin member 66 is an elastic member fixed to the protruding end surface of the first metal bead 64 by printing or coating, etc. For example, polyester fiber may be used as the first resin member 66.

As shown in FIGS. 3 and 4, the second separator 38 has a fuel gas flow field 68 on its surface 38a facing the MEA 48. The fuel gas flow field 68 is connected to the fuel gas supply passage 46a and the fuel gas discharge passage 46b. The fuel gas flow field 68 includes a plurality of fuel gas flow grooves 70 extending in the direction indicated by the arrow B. Each of the fuel gas flow grooves 70 may extend in a wavy pattern in the direction indicated by the arrow B.

A second seal 72 is provided on the second separator 38, around the outer peripheral portion of the second separator 38, for preventing leakage of the fluid (oxygen-containing gas, fuel gas, and coolant) to the outside from a portion between the MEA 34 and the second separator 38. The second seal 72 extends straight as viewed in the separator thickness direction (indicated by the arrow A). Alternatively, the second seal 72 may extend in a wavy pattern as viewed in the separator thickness direction.

In FIG. 4, the second seal 72 includes a second metal bead 74 formed integrally with the second separator 38, and a second resin member 76 provided on the second metal bead 74. The second metal bead 74 protrudes from the second separator 38 toward the resin frame member 50. The second metal bead 74 has a trapezoidal shape in lateral cross section which is tapered (narrowed) in a protruding direction in which the second metal bead 74 protrudes. The second resin member 76 is an elastic member fixed to the protruding end surface of the second metal bead 74 by printing or coating, etc. For example, polyester fiber may be used as the second resin member 76.

The first seal 62 and the second seal 72 are arranged in a manner that the first seal 62 and the second seal 72 are overlapped with each other as viewed in the separator thickness direction. Therefore, in the state where the tightening load is applied to the fuel cell stack 10, each of the first metal bead 64 and the second metal bead 74 is elastically deformed (deformed by compression). Further, in this state, a protruding end surface 62a of the first seal 62 (first resin member 66) contacts one surface 50a of the resin frame member 50 in an air tight and liquid tight manner, and a protruding end surface 72a of the second seal 72 (second resin member 76) contacts another surface 50b of the resin frame member 50 in an air tight and liquid tight manner.

The first resin member 66 may be provided on one surface 50a of the resin frame member 50 instead of the first metal bead 64. The second resin member 76 may be provided on the other surface 50b of the resin frame member 50 instead of the second metal bead 74. Further, at least one of the first resin member 66 and the second resin member 76 may be dispensed with. The first seal 62 and the second seal 72 may be elastic rubber members instead of metal bead seals.

In FIGS. 3 and 4, a coolant flow field 78 is provided between a surface 36b of the first separator 36 and a surface 38b of the second separator 38. The coolant flow field 78 is connected to the coolant supply passage 44a and the coolant discharge passage 44b. The coolant flow field 78 includes a plurality of coolant flow grooves 80 extending straight in the direction indicated by the arrow B. The coolant flow field 78 is formed on the back surface of the oxygen-containing gas flow field 58 and the back surface of the fuel gas flow field 68.

As shown in FIGS. 2 to 4, the fuel cell separator member 11 includes the first separator 36 and two load receivers 82a, 82b provided in the first separator 36.

As shown in FIGS. 2 to 4, two first support portions 84a, 84b are provided in the first separator 36. The first support portion 84a protrudes outward (in the direction indicated by the arrow C1) from one of the long sides (outer peripheral portion) of the first separator 36. The position of the first support portion 84a is shifted from the center of one of the long sides of the first separator 36 (in the direction indicated by the arrow B1) toward one end of the first separator 36 in a manner that the first support portion 84a faces the coupling member 24a. The first support portion 84a is provided integrally with the outer peripheral portion of the first separator 36 by press forming. The first support portion 84a supports the load receiver 82a.

In FIGS. 2 and 3, the first support portion 84b protrudes outward (in the direction indicated by the arrow C2) from the other of the long sides of the first separator 36 (outer peripheral portion). The position of the first support portion 84b is shifted from the center of the other of the long sides of the first separator 36 toward the other end of the first separator 36 (in the direction indicated by the arrow B2) in a manner to face the coupling member 24b. The first support portion 84b is provided integrally with the outer peripheral portion of the first separator 36 by press forming.

In the fuel cell separator member 11, the first support portions 84a, 84b may be formed as members separate from the first separator 36, and the first support portions 84a, 84b may be joined to the first separator 36. The first support portions 84a, 84b may not protrude outward from the outer peripheral portion of the first separator 36.

As shown in FIGS. 3 and 4, two second support portions 86a, 86b are provided in the second separator 38. The second support portion 86a protrudes outward (in the direction indicated by the arrow C1) from one of the long sides (outer peripheral portion) of the second separator 38. The second support portion 86a faces the first support portion 84a. The second support portion 86a is provided integrally with the outer peripheral portion of the second separator 38 by press forming. The second support portion 86a contacts the first support portion 84a, and supports the load receiver 82a.

In FIG. 3, the second support portion 86b protrudes outward (in the direction indicated by the arrow C2) from the other of the long sides (outer peripheral portion) of the second separator 38. The second support portion 86b faces the first support portion 84b. The second support portion 86b is provided integrally with the outer peripheral portion of the second separator 38 by press forming. The second support portion 86b contacts the first support portion 84b, and supports the load receiver 82b.

It should be noted that the second support portions 86a, 86b may be formed as members separate from the second separator 38, and the second support portions 86a, 86b may be joined to the second separator 38. The second support portions 86a, 86b may not protrude outward from the outer peripheral portion of the second separator 38.

In FIGS. 4 and 6, the load receiver 82a is provided in the outer peripheral portion (first support portion 84a) of the first separator 36 so as to protrude outward from the outer peripheral portion (first support portion 84a) of the first separator 36 in the direction indicated by the arrow C1. The load receiver 82a includes a metal plate 88 (core metal), and a resin member 90 which covers the metal plate 88 partially. The load receiver 82a is formed by insert molding.

Examples of materials of the metal plate 88 include the same materials as the materials of the first separator 36 and the second separator 38. The metal plate 88 includes an attachment portion 92 fixed to the first support portion 84a, and a base portion 94 coupled to the attachment portion 92 and protruding toward the outside of the first separator 36.

The attachment portion 92 has a substantially rectangular shape, and extends in the direction indicated by the arrow B. The attachment portion 92 is exposed from the resin member 90. The attachment portion 92 is disposed on a surface of the first support portion 84a where the resin frame equipped MEA 34 is positioned (surface opposite to the second support portion 86a). The attachment portion 92 is joined to the first support portion 84a by a joint portion 96a. The joint portion 96a extends in the direction indicated by the arrow B. The joint portion 96a is formed by spot welding, laser welding, MIG welding, TIG welding, brazing, etc.

In FIG. 6, the entire surface of the base portion 94 is covered with the resin member 90. The base portion 94 and the resin member 90 form a tab 98 protruding outward from the outer peripheral portion (first support portion 84a) of the first separator 36 in the direction indicated by the arrow C. The tab 98 of the load receiver 82a is inserted into a recess 100a formed in the coupling member 24a (see FIG. 4). In the structure, when the load in the direction indicated by the arrow B is applied to the tab 98 (load receiver 82a), the front end of the tab 98 in the direction indicated by the arrow B is brought into contact with the wall surface (side surface) forming the recess 100a, and thus, the coupling member 24a can receives the load. It should be noted that the coupling member 24a may be formed integrally with the cover 28. The coupling member 24b may be formed integrally with the cover 28 as well.

The tab 98 is formed symmetrically with respect to the central line CL that passes through the center of the tab 98 in the width direction (indicated by the arrow B) and extends in a protruding direction in which the tab 98 protrudes (in the direction indicated by the arrow C). The tab 98 includes a tab body 102 positioned at the center in the direction indicated by the arrow B, and a pair of expansions 104 expanded from both ends of the tab body 102 in the width direction toward both sides in the width direction.

As shown in FIG. 4, a circular positioning hole 108 is formed at the center of the tab body 102. A rod 106 for positioning each of the fuel cell separator members 11 is inserted into the positioning hole 108 at the time of producing the fuel cell stack 10. It should be noted that the rod 106 may be extracted from the positioning hole 108 after positioning of each of the fuel cell separator members 11 is completed. Alternatively, the rod 106 may be left in the positioning hole 108.

An outer peripheral marginal portion 94a of the base portion 94 has an R shape (circular arc shape). However, the outer peripheral marginal portion 94a of the base portion 94 may not have an R-shape. Chamfered portions may be formed at corners on both sides of the outer peripheral marginal portion 94a of the base portion 94.

In FIG. 6, holes 110 are formed in the base portion 94 for improving the fluidity of the resin material (melted resin) at the time of forming the load receiver 82a by inserting molding. The holes 110 include a first hole 110a, a second hole 110b, a third hole 110c, a fourth hole 110d, and a fifth hole 110e. The first hole 110a is positioned at the center of the base portion 94 in the direction indicated by the arrow B.

The first hole 110a is symmetrical with respect to the central line CL. The first hole 110a includes a first central hole 112 having a circular shape, and a second central hole 114 having a straight line shape. The center of the first central hole 112 is positioned on the central line CL. The first central hole 112 is larger than the positioning hole 108. That is, the central portion of the first central hole 112 functions as the positioning hole 108. The second central hole 114 extends in the direction indicated by the arrow B. The second central hole 114 is connected to the end of the first central hole 112 in the direction indicated by the arrow C2, the end being closer to the attachment portion 92 (closer to the first separator 36). The second central hole 114 extends further toward both sides in the direction indicated by the arrow B than the first central hole 112.

Figure 5A:
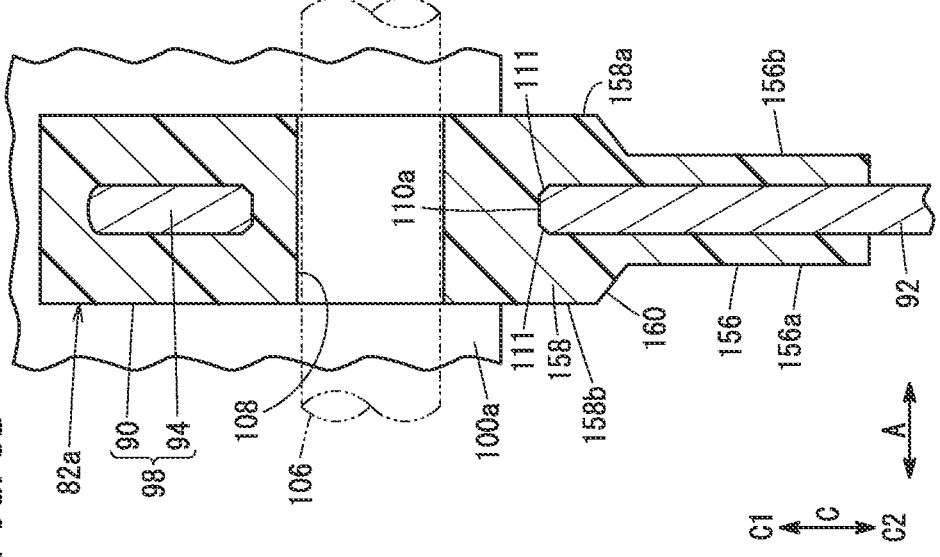
FIG. 5A is an enlarged cross sectional view showing a load receiver in FIG. 4.
Figure 5B:
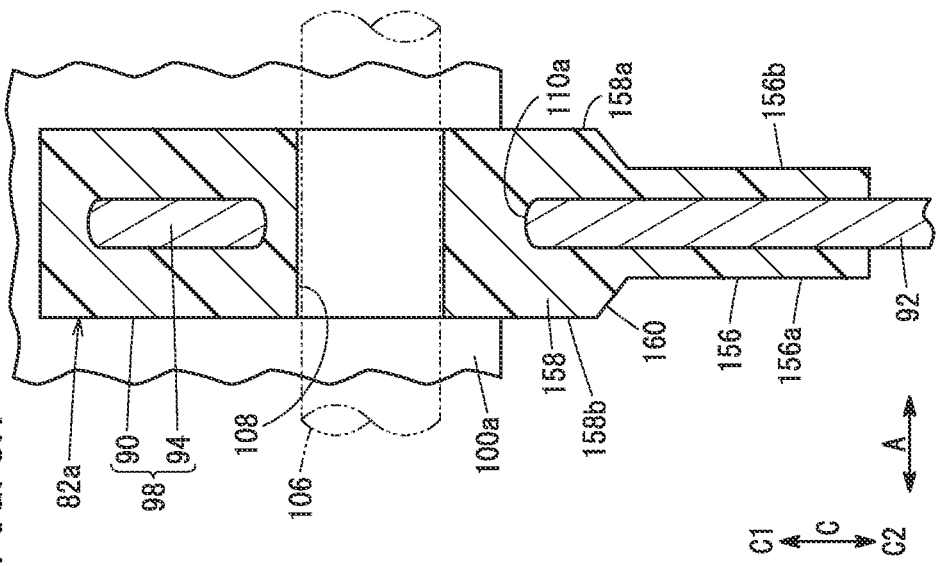
FIG. 5B is an enlarged cross sectional view showing an example of structure of a first hole formed in the load receiver in FIG. 5A.

As shown in FIGS. 4 and 5A, the cross sectional shape of the first hole 110a (shape in cross section indicated by a line IV-IV in FIG. 2, the inner circumferential surface of the first hole 110a, the surface forming the first hole 110a) has an R shape (circular arc shape) expanded inward in a radial direction (toward the inside of the first hole 110a). However, as shown in FIG. 5B, the cross sectional shape of the first hole 110a may not be an R shape, and chamfered portions 111 may be formed at corners on both sides of the cross sectional shape of the first hole 110a.

Further, as shown in FIG. 6, as viewed in the separator thickness direction, corners 113a, 113b of the first hole 110a are curved to have an R shape. Specifically, the corner 113a is positioned at a border portion between the first central hole 112 and the second central hole 114, and is curved toward the inside of the first hole 110a. The corner 113b is positioned at the corner of the second central hole 114, and is curved toward the outside of the first hole 110a.

The second hole 110b is positioned on one side of the central line CL in the width direction of the base portion 94 (in the direction indicated by the arrow B1). Stated otherwise, the second hole 110b is positioned away from the first central hole 112 in the direction indicated by the arrow B1. The second hole 110b has a substantially circular shape. The diameter of the second hole 110b is smaller than the diameter of the positioning hole 108. The center of the second hole 110b is positioned further in a protruding direction in which the tab 98 protrudes (in the direction indicated by the arrow C1) than the center of the first central hole 112.

The cross sectional shape of the second hole 110b (the inner circumferential surface of the second hole 110b, the surface forming the second hole 110b) has an R shape (circular arc shape) expanded inward in a radial direction (toward the inside of the second hole 110b). It should be noted that the cross sectional shape of the second hole 110b may not be an R shape, and chamfered portions may be formed at corners on both sides of the cross sectional shape of the second hole 110b.

The third hole 110c is positioned on the other side of the central line CL in the width direction of the base portion 94 (in the direction indicated by the arrow B2). Stated otherwise, the third hole 110c is positioned away from the first central hole 112 in the direction indicated by the arrow B2. The third hole 110c has a substantially circular shape. The diameter of the third hole 110c is smaller than the diameter of the positioning hole 108. The shape and the size of the third hole 110c are the same as the shape and the size of the second hole 110b. The center of the third hole 110c is positioned further in a protruding direction in which the tab 98 protrudes (in the direction indicated by the arrow C1) than the center of the first central hole 112.

The cross sectional shape of the third hole 110c (the inner circumferential surface of the third hole 110c, the surface forming the third hole 110c) has an R shape (circular arc shape) expanded inward in a radial direction (toward the inside of the third hole 110c). It should be noted that the cross sectional shape of the third hole 110c may not be an R-shape, and chamfered portions may be formed at corners on both sides of the cross sectional shape of the third hole 110c.

The fourth hole 110d is positioned on one side of the central line CL in the width direction of the base portion 94 (in the direction indicated by the arrow B1). The fourth hole 110d is positioned away from the second hole 110b toward the first separator 36 (in the direction indicated by the arrow C2). The fourth hole 110d is positioned away from the second central hole 114 in the direction indicated by the arrow B1. The fourth hole 110d has an L-shape. The fourth hole 110d includes a first straight hole 128 extending in the direction indicated by the arrow B and a second straight hole 130 extending in the direction indicated by the arrow C. The second straight hole 130 extends in the direction indicated by the arrow C1 from an end of the first straight hole 128 in the direction indicated by the arrow B1. The extended end of the second straight hole 130 has a circular arc shape.

The cross sectional shape of the fourth hole 110d (the inner circumferential surface of the fourth hole 110d, the surface forming the fourth hole 110d) has an R shape (circular arc shape) expanded inward in a radial direction (toward the inside of the fourth hole 110d). It should be noted that the cross sectional shape of the fourth hole 110d may not be an R-shape, and chamfered portions may be formed at corners on both sides of the cross sectional shape of the fourth hole 110d. Further, as viewed in the separator thickness direction (indicated by the arrow A), corners 132 of the fourth hole 110d are curved to have an R shape.

The fifth hole 110e is positioned on the other side of the central line CL in the width direction of the base portion 94 (in the direction indicated by the arrow B2). The fifth hole 110e is positioned away from the third hole 110c toward the first separator 36 (in the direction indicated by the arrow C2). The fifth hole 110e is positioned away from the second central hole 114 in the direction indicated by the arrow B2. The fifth hole 110e has a shape formed by horizontally flipping the fourth hole 110d (shape formed by horizontally flipping the L-shape). The fifth hole 110e includes a third straight hole 142 extending in the direction indicated by the arrow B, and a fourth straight hole 144 extending in the direction indicated by the arrow C. The fourth straight hole 144 extends in the direction indicated by the arrow C1 from an end of the third straight hole 142 in the direction indicated by the arrow B2. The extended end of the fourth straight hole 144 has a circular arc shape.

The cross sectional shape of the fifth hole 110e (the inner circumferential surface of the fifth hole 110e, the surface forming the fifth hole 110e) has an R shape (circular arc shape) expanded inward in a radial direction (toward the inside of the fifth hole 110e). It should be noted that the cross sectional shape of the fifth hole 110e may not be an R-shape, and chamfered portions may be formed at corners on both sides of the cross sectional shape of the fifth hole 110e. Further, as viewed in the separator thickness direction, corners 146 of the fifth hole 110e are curved to have an R shape.

The number, the positions, the shapes, and the sizes of the holes 110 can be changed as necessary.

As shown in FIGS. 4 and 6, the resin member 90 is an electrically insulating member, and interrupts electrical connection between the base portion 94 and the coupling member 24*a*. Examples of materials of the resin member 90 include thermoplastic resin, thermosetting resin, and thermoplastic elastomer. The resin member 90 includes a thin portion 156 and a thick portion 158.

The thin portion 156 is positioned closer to the first separator 36 than the thick portion 158 is. Stated otherwise, the thin portion 156 and the thick portion 158 are arranged side by side in a protruding direction in which the tab 98 protrudes. That is, the thin portion 156 covers the entire root part of the base portion 94 adjacent to the attachment portion 92.

The thick portion 158 covers the entire part of the base portion 94 positioned further in the direction indicated by the arrow C1 than the root part of the base portion 94. A step 160 is formed at a border between the thin portion 156 and the thick portion 158. The step 160 extends in the direction indicated by the arrow B up to both ends of the resin member 90. The step 160 is positioned closer to the first separator 36 (in the direction indicated by the arrow C2) than the holes 110 is. The step 160 is a flat inclined surface inclined toward the first separator 36, and toward the base portion 94 (see FIGS. 4 and 5A).

The length L1 of the thin portion 156 in the direction indicated by the arrow C is smaller than the length L2 of the thick portion 158 in the direction indicated by the arrow C (see FIG. 6). It should be noted that the length L1 and the length L2 can be determined as necessary. In FIG. 4, the thickness D1 of the thin portion 156 is smaller than the thickness D2 of the thick portion 158. The thickness D1 of the thin portion 156 herein means the distance between one outer surface 156*a* and another outer surface 156*b* of the thin portion 156. The thickness D2 of the thick portion 158 herein means the distance between one outer surface 158*a* and another outer surface 158*b* of the thick portion 158. Preferably, the thickness D1 is in the range between 50% and 90% (inclusive) of the thickness D2, and more preferably, in the range between 60% and 80% (inclusive) of the thickness D2. It should be noted that the thicknesses D1 and D2 can be determined as necessary.

In the thin portion 156, the thickness d1 between the base portion 94 and the one outer surface 156*a* of the thin portion 156 is the same as the thickness between the base portion 94 and the other outer surface 156*b* of the thin portion 156. In the thick portion 158, the thinness d2 between the base portion 94 and the one outer surface 158*a* of the thick portion 158 is the same as the thickness between the base portion 94 and the other outer surface 158*b* of the thick portion 158. The thickness d1 is smaller than the thickness d2.

A gap S1 between the thin portions 156 that are adjacent to each other in the direction indicated by the arrow A is larger than a gap S2 between the thick portions 158 that are adjacent to each other. An outer marginal portion of the resin frame member 50 is positioned in the gap S1. Stated otherwise, the thin portion 156 includes an overlap part 161 overlapped with the resin frame member 50 as viewed in the separator thickness direction. That is, the resin frame member 50 extends toward the outside of the first separator 36 in a manner to cover the attachment portion 92 of the load receiver 82*a*. Therefore, due to the presence of the resin frame member 50, it is possible to eliminate or reduce the situations where the attachment portion 92 directly contacts the joint separator 39 adjacent thereto in the direction indicated by the arrow A.

In FIG. 6, the resin member 90 includes a covering portion 162*a*, a first filling portion 162*b*, a second filling portion 162*c*, a third filling portion 162*d*, and a fourth filling portion 162*e*. The covering portion 162*a* is inserted into the first hole 110*a*. The covering portion 162*a* has an outer shape corresponding to the shape of the first hole 110*a*. The positioning hole 108 is formed in the covering portion 162*a*. The first filling portion 162*b* is inserted into the second hole 110*b*. The first filling portion 162*b* has an outer shape (circular shape) corresponding to the shape of the second hole 110*b*.

The second filling portion 162*c* is inserted into the third hole 110*c*. The second filling portion 162*c* has an outer shape (circular shape) corresponding to the shape of the third hole 110*c*. The third filling portion 162*d* is inserted into the fourth hole 110*d*. The third filling portion 162*d* has an outer shape (L-shape) corresponding to the shape of the fourth hole 110*d*. The fourth filling portion 162*e* is inserted into the fifth hole 110*e*. The fourth filling portion 162*e* has an outer shape (shape formed by horizontally flipping the L-shape) corresponding to the shape of the fifth hole 110*e*.

In the load receiver 82*a*, the holes 110 are disposed so as to be overlapped with only the thick portion 158, of the thick portion 158 and the thin portion 156, as viewed in the separator thickness direction. Stated otherwise, the holes 110 are disposed at positions which are not overlapped with the thin portion 156, as viewed in the separator thickness direction.

As shown in FIGS. 2 and 3, the load receiver 82*b* has the same structure as the above-described load receiver 82*a*. Stated otherwise, the load receiver 82*b* has a shape formed by reversing the load receiver 82*a* in the direction indicated by the arrow C. Therefore, the description about the detailed structure of the load receiver 82*b* is omitted. It should be noted that the tab 98 of the load receiver 82*b* is inserted into a recess 100*b* formed in the coupling member 24*b* (see FIG. 2).

Further, the attachment portion 92 of the load receiver 82*b* is disposed on a surface of the first support portion 84*b* where the resin frame equipped MEA 34 is positioned (surface opposite to the second support portion 86*b*). The attachment portion 92 of the load receiver 82*b* is joined to the first support portion 84*b* by a joint portion 96*b*. The joint portion 96*b* has the same structure as the joint portion 96*a*.

As shown in FIGS. 3 and 4, the joint separator 39 is provided with a reinforcement rib 164. The rib 164 includes first ribs 166*a*, 166*b* formed to protrude from the surface 36*a* of the first separator 36, and second ribs 168*a*, 168*b* formed to protrude from the surface 38*a* of the second separator 38.

The first ribs 166*a*, 166*b* protrude in a protruding direction in which the first metal bead 64 protrudes. The first rib 166*a* is positioned between the first seal 62 and the attachment portion 92 of the load receiver 82*a*.

The first rib 166*a* extends straight in the direction (indicated by the arrow B) in which the joint portion 96*a* extends. The first rib 166*a* extends in the direction indicated by the arrow B along the attachment portion 92 of the load receiver 82*a* by substantially the same length as the attachment portion 92. The first rib 166*a* has a trapezoidal shape in lateral cross section which is tapered (narrowed) in a protruding direction in which the first rib 166*a* protrudes (see FIG. 4).

The first rib 166*b* is positioned between the first seal 62 and the attachment portion 92 of the load receiver 82*b*. The first rib 166*b* has the same structure as the above-described first rib 166*a*. Therefore, the description of the structure of the first rib 166*b* is omitted.

The second ribs 168*a*, 168*b* protrude in a protruding direction in which the second metal bead 74 protrudes. The second rib 168a has a trapezoidal shape in lateral cross section which is tapered (narrowed) in a protruding direction in which the second rib 168a protrudes (see FIG. 4). The second rib 168b has the same structure as the above-described second rib 168a. Therefore, the description of the structure of the second rib 168b is omitted.

The first rib 166a and the second rib 168a are overlapped with each other as viewed in the separator thickness direction (indicated by the arrow A). Therefore, in the state where a tightening load is applied to the fuel cell stack 10, the protruding end surface of the first rib 166a contacts one surface 50a of the resin frame member 50, and the protruding end surface of the second rib 168a contacts the other surface 50b of the resin frame member 50.

At this time, the tightening load is not applied to the first rib 166a and the second rib 168a. That is, the first rib 166a and the second rib 168a are not deformed elastically. Therefore, the surface pressures of the first seal 62 and the second seal 72 are not affected by the first rib 166a and the second rib 168a. The surface pressures of the first seal 62 and the second seal 72 are not affected by the first rib 166b and the second rib 168b as well.

In this case, the fuel cell separator member 11 and the fuel cell (power generation cell 12) according to the embodiment of the present invention offer the following advantages.

The tab 98 of the load receiver 82a, 82b includes the base portion 94 in the form of a metal plate, and the resin member 90 configured to cover the base portion 94. The holes 110 are formed in the base portion 94, and the inner circumference of the holes 110 is covered with a part of the resin member 90. The resin member 90 includes the thick portion 158, and the thin portion 156 positioned closer to the first separator 36 than the thick portion 158 is. The holes 110 are disposed so as to be overlapped with the thick portion 158, of the thick portion 158 and the thin portion 156.

In the structure, at the time of forming the load receivers 82a, 82b by insert molding, it is possible to improve the fluidity of the resin material (melted resin), by disposing the holes 110 of the base portion 94 in the thick portion 158. Accordingly, it is possible to efficiently form the load receivers 82a, 82b by insert molding.

At the time of forming the load receiver 82a, 82b by insert molding, a sink tends to be formed easily in the resin material where the holes 110 are positioned. Therefore, the thickness of the resin member 90 where the holes 110 are positioned tends to be thin. However, as viewed in the separator thickness direction, the holes 110 of the base portion 94 are disposed so as to be overlapped with the thick portion 158. Thus, it is possible to eliminate or reduce the situations where the thickness of the thin portion 156 is reduced to a greater extent due to the sink of the resin material at the time of forming the load receivers 82a, 82b by insert molding. Accordingly, it is possible to suppress decrease in the strength of the thin portion 156 of the resin member 90.

The holes 110 include the first hole 110a positioned at the center of the base portion 94 in the width direction of the tab 98, the second hole 110b positioned away from the first hole 110a toward one side in the width direction of the tab 98, and the third hole 110c positioned away from the first hole 110a toward the other side in the width direction of the tab 98. The second hole 110b and the third hole 110c are provided at symmetrical positions with respect to the central line CL passing through the center of the base portion 94 in the width direction of the tab 98 and extending in a direction in which the tab 98 protrudes.

In the structure, at the time of forming the load receivers 82a, 82b by insert molding, it is possible to improve the fluidity of the resin material by the first hole 110a, the second hole 110b, and the third hole 110c efficiently.

The holes 110 include the fourth hole 110d positioned away from the second hole 110b toward the first separator 36 and the fifth hole 110e positioned away from the third hole 110c toward the first separator 36. The fourth hole 110d and the fifth hole 110e are provided at symmetrical positions with respect to the central line CL.

In the structure, at the time of forming the load receivers 82a, 82b by insert molding, it is possible to improve the fluidity of the resin material by the fourth hole 110d and the fifth hole 110e more efficiently.

The first hole 110a has a symmetrical shape about the central line CL.

In the structure, at the time of forming the load receivers 82a, 82b by insert molding, it is possible to improve the fluidity of the resin material by the first hole 110a more efficiently.

The cross sectional shape of the hole 110 is formed in an R shape expanded toward the inside of the hole 110, or the corner of the hole 110 in cross section includes a chamfered portion.

In the structure, it is possible to eliminate or reduce the situations where stress is concentrated on the resin member 90 from the inner circumferential surface of the hole 110, by expansion/contraction of the base portion 94 and the resin member 90 at the time of forming the load receivers 82a, 82b by insert molding. Therefore, it is possible to suppress formation of cracks in the resin member 90.

The resin frame member 50 is provided in the outer peripheral portion of the MEA 48 in a manner to cover the outer peripheral portion of the first separator 36, and the thin portion 156 includes the overlap part 161 overlapped with the resin frame member 50 as viewed in the separator thickness direction.

In the structure, by using the resin frame member 50, it is possible to effectively eliminate or reduce the situations where the joint separators 39 that are adjacent to each other are connected electrically.

The present invention is not limited to the above-described embodiment. Various modifications can be made without departing from the gist of the present invention.

The attachment portion 92 of the load receiver 82a, 82b may be disposed between the outer peripheral portion (first support portions 84a, 84b) of the first separator 36 and the outer peripheral portion (second support portions 86a, 86b) of the second separator 38. In this case, it is possible to improve the joining strength of joining the load receiver 82a, 82b and the joint separator 39 together.

The above embodiment can be summarized as follows:

The above embodiment discloses the fuel cell separator member (11). The fuel cell separator member includes the separator (36) and the load receiver (82a, 82b) having the tab (98) protruding from an outer peripheral portion of the separator toward the outside of the separator. The tab includes the base portion (94) in the form of a metal plate, and the resin member (90) configured to cover the base portion. The hole (110) is formed in the base portion, and the inner circumference of the hole is covered with a part of the resin member. The resin member may include the thick portion (158), and the thin portion (156) positioned closer to the separator than the thick portion is. The hole is disposed so as to be overlapped with the thick portion, of the thick portion and the thin portion.

In the fuel cell separator member, the hole may include the first hole (110a) positioned at the center of the base portion in a width direction of the tab perpendicular to a separator thickness direction and to a direction in which the tab protrudes, and the second hole (110b) positioned away from the first hole toward one side in the width direction of the tab, and the third hole (110c) positioned away from the first hole toward the other side in the width direction of the tab. The second hole and the third hole may be provided at symmetrical positions with respect to a central line (CL) passing through the center of the base portion in the width direction of the tab and extending in a direction in which the tab protrudes.

In the fuel cell separator member, the hole may include the fourth hole (110d) positioned away from the second hole toward the separator, and the fifth hole (110e) positioned away from the third hole toward the separator, and the fourth hole and the fifth hole may be provided at symmetrical positions with respect to the central line.

In the fuel cell separator member, the first hole may have a symmetrical shape about the central line.

In the fuel cell separator member, the cross sectional shape of the hole may be formed in an R shape expanded toward the inside of the hole.

In the fuel cell separator member, the corner of the hole in cross section may have a chamfered portion.

In the fuel cell separator member, the first hole may include the first central hole having a circular shape, and the second central hole having a straight line shape and extending in the width direction, the center of the first central hole may be positioned on the central line, and the second central hole may be connected to an end of the first central hole on the separator side.

The above embodiment discloses the fuel cell (12) including the membrane electrode assembly (48) including the electrolyte membrane (52) and the electrodes (54, 56) provided on both sides of the electrolyte membrane, the fuel cell separator member provided on one surface of the membrane electrode assembly, and the separator (38) provided on the other surface of the membrane electrode assembly. The fuel cell separator member is the fuel cell separator member as described above.

In the fuel cell, the resin frame portion (50) may be provided in the outer peripheral portion of the membrane electrode assembly in a manner to cover the outer peripheral portion of the separator forming the fuel cell separator member, and the thin portion may have the overlap part (161) overlapped with the resin frame portion, as viewed in the separator thickness direction.

What is claimed is:

1. A fuel cell separator member comprising:
    a separator; and
    a load receiver including a tab protruding from an outer peripheral portion of the separator toward an outside of the separator,
    wherein the tab comprises:
    a base portion in a form of a metal plate; and
    a resin member configured to cover the base portion,
    a hole is formed in the base portion, an inner circumference of the hole being covered with a part of the resin member,
    the resin member comprises:
    a thick portion; and
    a thin portion positioned closer to the separator than the thick portion is, and
    the hole is disposed so as to be overlapped with the thick portion, of the thick portion and the thin portion.

2. The fuel cell separator member according to claim 1, wherein the hole comprises:
    a first hole positioned at a center of the base portion in a width direction of the tab perpendicular to a separator thickness direction and to a direction in which the tab protrudes;
    a second hole positioned away from the first hole toward one side in the width direction of the tab; and
    a third hole positioned away from the first hole toward another side in the width direction of the tab, and
    the second hole and the third hole are provided at symmetrical positions with respect to a central line passing through the center of the base portion in the width direction of the tab and extending in the direction in which the tab protrudes.

3. The fuel cell separator member according to claim 2, wherein the hole comprises:
    a fourth hole positioned away from the second hole toward the separator; and
    a fifth hole positioned away from the third hole toward the separator, and
    the fourth hole and the fifth hole are provided at symmetrical positions with respect to the central line.

4. The fuel cell separator member according to claim 2, wherein the first hole has a symmetrical shape about the central line.

5. The fuel cell separator member according to claim 1, wherein a cross sectional shape of the hole is formed in an R shape expanded toward an inside of the hole.

6. The fuel cell separator member according to claim 1, wherein a corner of the hole in cross section includes a chamfered portion.

7. The fuel cell separator member according to claim 2, wherein the first hole comprises:
    a first central hole having a circular shape; and
    a second central hole having a straight line shape and extending in the width direction,
    a center of the first central hole is positioned on the central line, and
    the second central hole is connected to an end of the first central hole on a side of the separator.

8. A fuel cell comprising:
    a membrane electrode assembly comprising an electrolyte membrane, and electrodes provided on both sides of the electrolyte membrane;
    a fuel cell separator member provided on one surface of the membrane electrode assembly; and
    a separator provided on another surface of the membrane electrode assembly,
    wherein the fuel cell separator member comprises:
    a separator; and
    a load receiver including a tab protruding from an outer peripheral portion of the separator toward an outside of the separator,
    the tab comprises:
    a base portion in a form of a metal plate; and
    a resin member configured to cover the base portion,
    a hole is formed in the base portion, an inner circumference of the hole being covered with a part of the resin member,
    the resin member comprises:
    a thick portion; and
    a thin portion positioned closer to the separator than the thick portion is, and
    the hole is disposed so as to be overlapped with the thick portion, of the thick portion and the thin portion.

9. The fuel cell according to claim 8, wherein the hole comprises:
   a first hole positioned at a center of the base portion in a width direction of the tab perpendicular to a separator thickness direction and to a direction in which the tab protrudes;
   a second hole positioned away from the first hole toward one side in the width direction of the tab; and
   a third hole positioned away from the first hole toward another side in the width direction of the tab, and
   the second hole and the third hole are provided at symmetrical positions with respect to a central line passing through the center of the base portion in the width direction of the tab and extending in the direction in which the tab protrudes.

10. The fuel cell according to claim 9, wherein the hole comprises:
   a fourth hole positioned away from the second hole toward the separator; and
   a fifth hole positioned away from the third hole toward the separator, and
   the fourth hole and the fifth hole are provided at symmetrical positions with respect to the central line.

11. The fuel cell according to claim 9, wherein the first hole has a symmetrical shape about the central line.

12. The fuel cell according to claim 8, wherein a cross sectional shape of the hole is formed in an R shape expanded toward an inside of the hole.

13. The fuel cell according to claim 8, wherein a corner of the hole in cross section includes a chamfered portion.

14. The fuel cell according to claim 9, wherein the first hole comprises:
   a first central hole having a circular shape; and
   a second central hole having a straight line shape and extending in the width direction,
   a center of the first central hole is positioned on the central line, and
   the second central hole is connected to an end of the first central hole on a side of the separator.

15. The fuel cell according to claim 8, wherein
   a resin frame portion is provided in an outer peripheral portion of the membrane electrode assembly in a manner to cover an outer peripheral portion of the separator forming the fuel cell separator member, and
   the thin portion has an overlap part overlapped with the resin frame portion, as viewed in a separator thickness direction.

* * * * *